Nov. 26, 1963　　　　M. LANGTREE　　　　3,112,039
EQUIPMENT FOR HANDLING CARGO
Filed May 23, 1961　　　　　　　　　　　6 Sheets-Sheet 1

INVENTOR
MICHAEL LANGTREE
ATTORNEYS

Nov. 26, 1963   M. LANGTREE   3,112,039
EQUIPMENT FOR HANDLING CARGO
Filed May 23, 1961   6 Sheets-Sheet 6
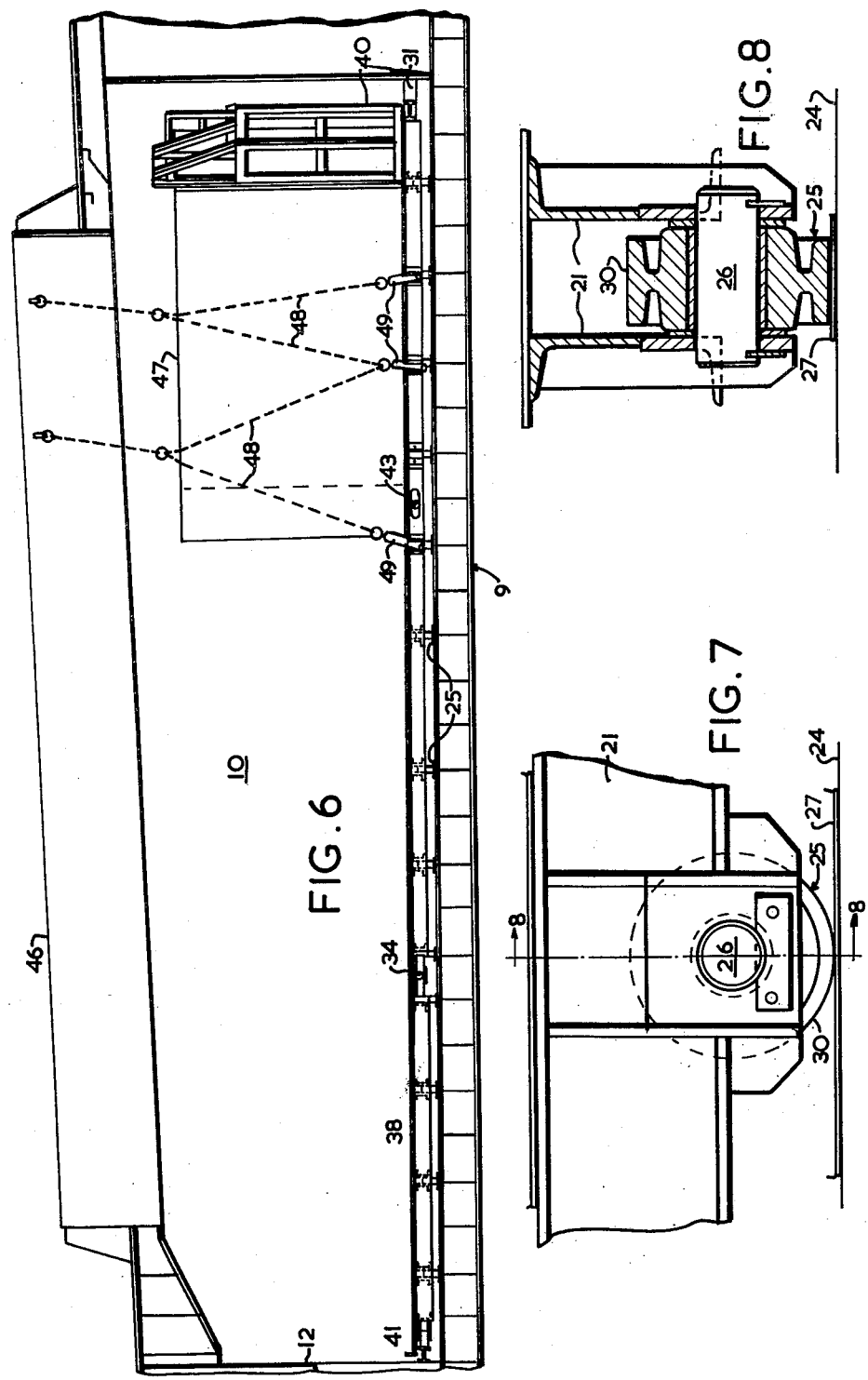

United States Patent Office 3,112,039
Patented Nov. 26, 1963

3,112,039
EQUIPMENT FOR HANDLING CARGO
Michael Langtree, Roseville, New South Wales, Australia, assignor to The Australian Coastal Shipping Commission, South Melbourne, Victoria, Australia, a body corporate of Australia
Filed May 23, 1961, Ser. No. 111,958
Claims priority, application Australia June 2, 1960
2 Claims. (Cl. 214—15)

This invention relates to equipment for handling cargo and more particularly to equipment for stowing cargo in the wings of a ship and to bring such stowed cargo into a position to facilitate unloading.

The stowage and making fast of cargo in the hold of a ship has hitherto been a problem of considerable magnitude. Similarly, problems have arisen in making the stowed cargo available for discharge.

The difficulties normally render the work hazardous to stevedores occupied in the hold of a vessel, and a consequential disadvantage arises in the cargo space not being loaded in the most economical manner, both in time and effect.

A major object of the present invention is to provide a cargo handling equipment whereby the said disadvantages are substantially removed.

Another object of the invention is to provide cargo handling equipment for facilitating the stowage and discharge of pre-packaged cargo either bundled or confined in bulk containers.

A further object of the invention is to provide cargo handling equipment whereby the loading and trim of a vessel can be more readily predetermined.

A still further object is to provide cargo handling equipment whereby the wings of a hold are stowed simultaneously.

In a general aspect the present invention is equipment for handling ship' cargo in association with a ship's floor, the said equipment comprising two longitudinally extending pallets displaceably supported on the floor and having power operated means for transversely displacing the pallets towards or away from each other simultaneously, said displacing means comprising approximately central main longitudinal shafting, means for rotating the main shafting, spaced transverse screw-threaded rotatable shafts, each threadably secured at its outer end to one pallet, and means rotatably coupling each transverse shaft at its inner end to the main shafting.

An embodiment of the invention will now be more specifically described but it is to be understood that the construction represented is exemplary only, and is not to be restrictively interpreted.

It is also to be understood that the equipment in accordance with this invention is adapted for installation in existing ships of the class contemplated, or alternatively the equipment can be incorporated in such ships during building, in which case each ship so built comes within the scope of this invention.

The embodiment of the invention is also illustrated in the accompanying drawings in which:

FIG. 6 is an elevation in section on the line 6—6 in FIG. 2 showing an item of cargo secured in place on the pallet.

FIG. 7 is an elevation of one of the pallet supporting rollers, and,

FIG. 8 is a cross section of the roller on the line 8—8 in FIG. 7.

Figure 1:
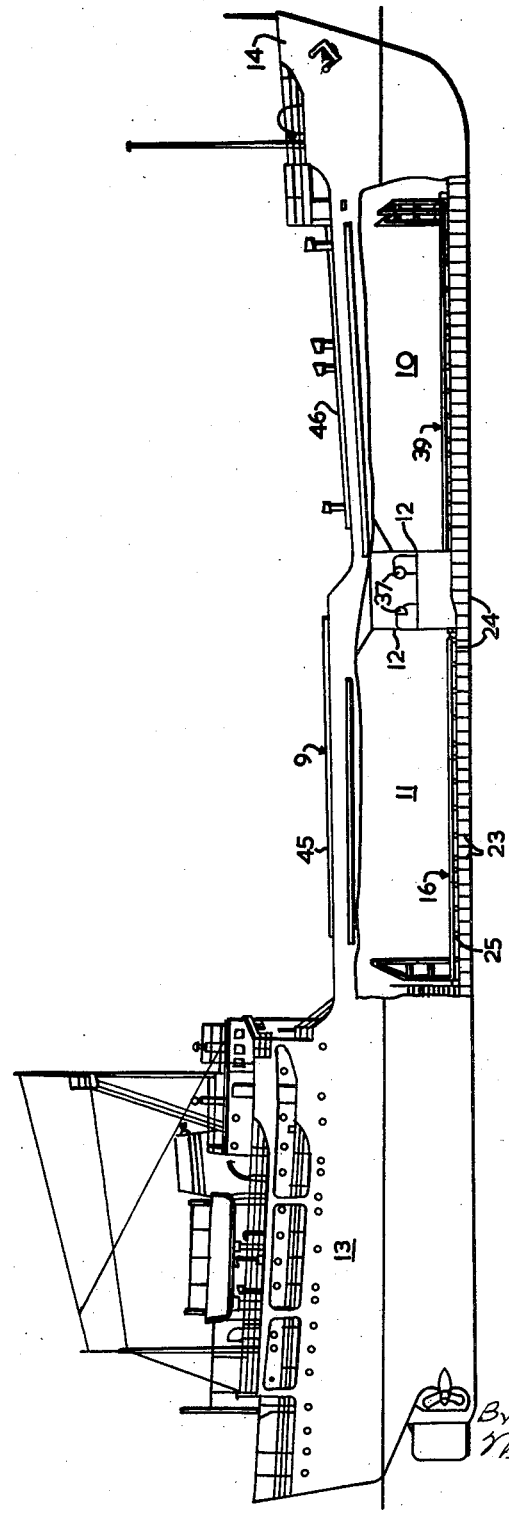
FIG. 1 is a side elevation of a typical ship with portion of its side plating cut away to reveal the interior of the holds wherein are incorporated the moving pallets.
Figure 2:
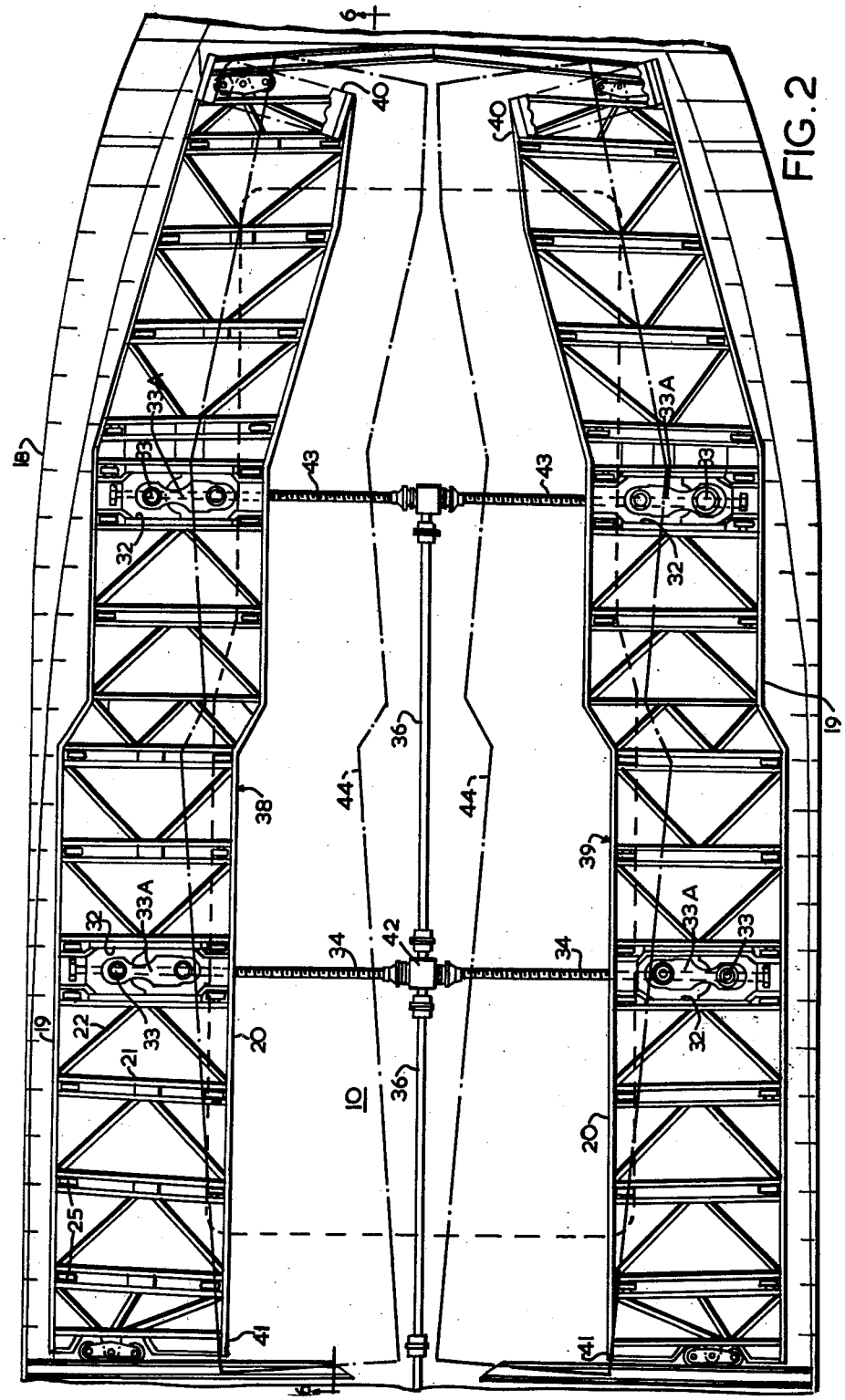
FIG. 2 is a plan view of the forward hold of the vessel in section just above the water line showing the two pallets at the outward limit of their travel.

For the purpose of description it will be assumed that the equipment is installed in a cargo vessel 9 having fore and aft holds 10 and 11 divided substantially amidship by spaced bulkheads 12 providing ballast space, and having propulsion and auxiliary machinery disposed at the rear 13 of the aft hold 11.

In a vessel of this character the aft hold 11 is normally approximately rectangular in plan and the forward hold 10 is shaped to conform to the sheer of the vessel towards the bow 14.

Accordingly, the equipment in compliance with this invention differs relatively in form but not in principle between the aft and forward hold installations 10 and 11, but it will be apparent that the equipment must be adapted for each specific installation.

In respect of the installation here being described as an embodiment of the invention, the aft hold 11 of the vessel 9 is provided with a pair of elongated pallets 15 and 16 symmetrically disposed in opposite relationship on the starboard 17 and port 18 sides of the vessel 9.

Each pallet 15 and 16 extends for approximately the full length of the hold 11 and comprises an elongated framework of structural sections having a pair of longitudinal members 19 and 20 spaced apart and joined by a plurality of spaced transverse members 21 stiffened by knee braces 22.

The spacing of the transverse members 21 corresponds to the pitch of alternate floors 23 of the ship's bottom 24 in the area of the hold 11.

At a short distance inward from each end of each transverse member 21 rollers 25 are rotatably journaled on shafts 26 affixed to each said member 21, so that the pallet is supported by the rollers 25 which run on tracks 27 mounted on the said alternate floors 23 of the ship's bottom 24.

Each end of the said pallets 15 and 16 is provided with spaced rollers 28 mounted on shafts the axes of which are normally upright, the said upright shafts being rotatably journaled in brackets 29, the threads 30 of the rollers 25 engaging tracks 31 secured to the bulkheads 12 of the hold 11, thereby substantially preventing endwise displacement of the pallet 15 or 16 without restricting lateral movement.

Each pallet 15 and 16 is provided with two or more housings 32 spaced apart and inwardly from each end, each said housing 32 containing a crosshead incorporating a self-aligning axially non-rotatable internally screw-threaded trunnioned sleeve 33 pivotally mounted on a normally vertical axis near one end of a pair of flanking side plates forming a link 33A connecting the said sleeve to the housing 32.

The sleeves 33 are severally engaged by suitably screw-threaded shafts 34 which extend from the respective housings 32 of the starboard and port pallets 15 and 16 respectively, each pair of screwthreaded shafts 34 being in alignment and coupled to lateral output shafts of gear trains 35 mounted in gear boxes located on the longitudinal centre line of the vessel 9.

The input shafts of the gear trains 35 are coupled to a main driving shaft 36 which is coupled to a source of rotary motion 37.

The said main driving shaft 36 is rotatably mounted on the longitudinal centre line of the vessel 9 in bearings affixed to the inner floor, vertical keel 24 or other suitable part of the framing.

Figure 3:
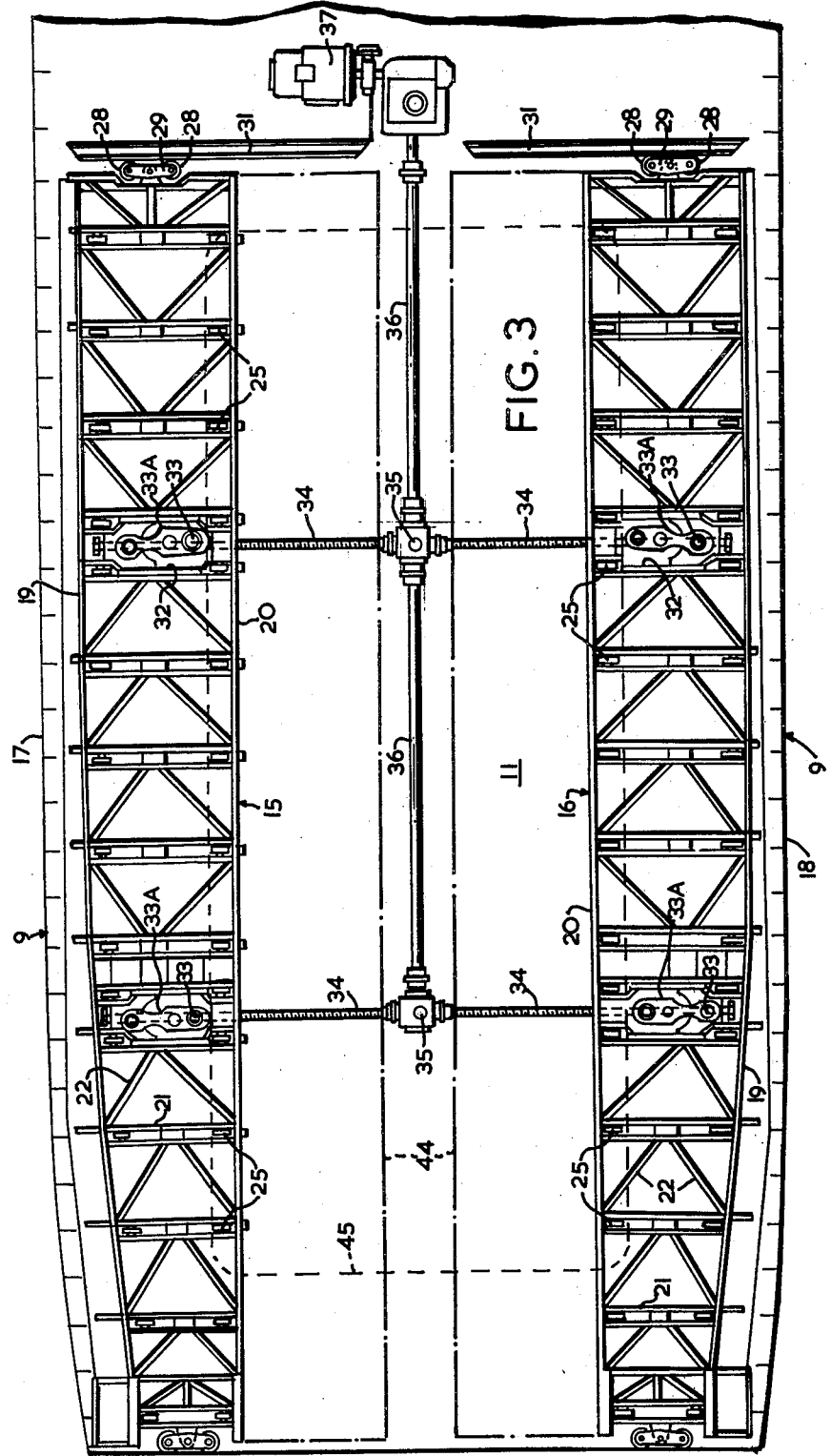
FIG. 3 is a similar view of the aft hold.
Figure 4:
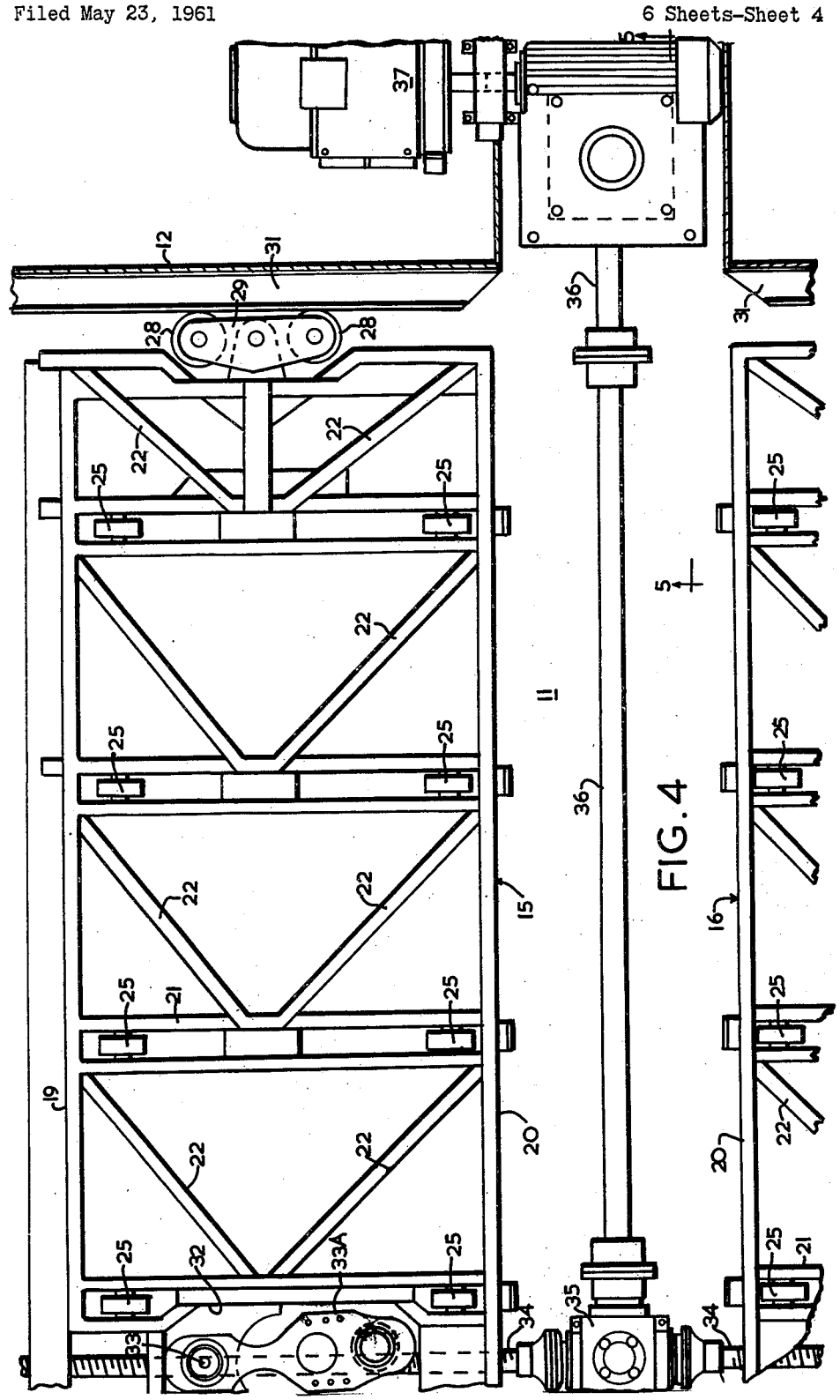
FIG. 4 is an enlarged fragmentary plan of forward end of the port pallet in the aft hold showing part of the drive mechanism, and the pallets at the inward limit of their travel.
Figure 5:
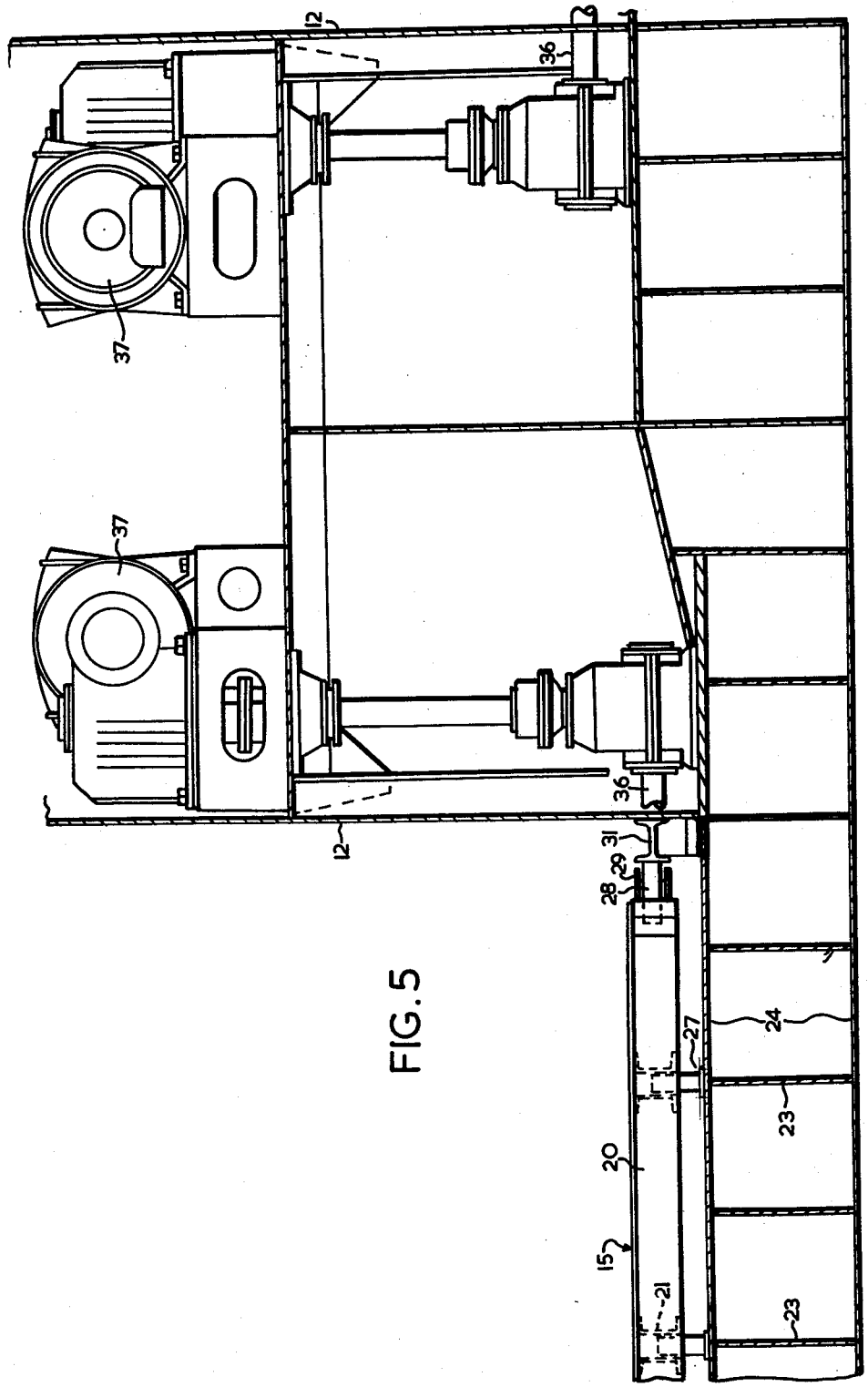
FIG. 5 is an elevation on the line 5—5 in FIG. 4.

It may now be seen that by rotation of the main driving shaft 36 in the appropriate direction the pallets 15 and 16 can be simultaneously displaced relative to each other, from the position shown in FIG. 3 to that shown in FIG. 4 or vice versa by the means described.

It will, of course, be understood that the screwthreaded sleeves 33 and the screwthreaded shafts 34 have matching threads, and also where the type of gear train 35 adopted requires, the starboard and port sleeves and shafts will be screwed with right and left hand threads respectively.

The foregoing description of the invention is applicable to the equipment for the forward hold 10 except insofar as the modified construction and operation rendered necessary by the sheer of the vessel 9.

It will be apparent that at a position nearest the bow 14 of the vessel 9 the lateral distance to be traversed by the adjacent ends 40 of the starboard and port pallets 38 and 39 will be less than the ends 41 of the said pallets 38 and 39 adjacent amid-ships 12.

Accordingly, compensation is made by altering the gear train 42 ratio or the pitch of the screwthreads 43 in the most forward operating mechanism and at the same time making provision for the arcuate movement of the rear ends 41 of the forward hold pallets 38 and 39.

The pallets 15, 16, 38 and 39 form a convenient and secure attachment for baling trusses and tensioning gear by means of which cargo mounted on the pallets can be made fast with security.

To load the pallets, they are brought to a position as shown by lines 44 under the hatch 45 or 46 and cargo 47, see FIG. 6, lowered in the customary manner.

During loading the packaged cargo can be manoeuvred from each side of the pallets and on completion of loading, rotation of the respective main driving shafts 36 will cause the pallets 15 and 16 or 38 and 39, to move into the port and starboard wings of the holds 10 or 11, and when fully stowed and at rest the cargo is made fast to the pallets by chains 48 tensioned by bottle screws 49.

The cargo and pallets will remain stowed by the irreversibility of the idle screwthreaded shafts 34 or 43 and sleeves 33 engaged in the housings 32 affixed to the pallets.

With the pallets spaced apart and the wing cargo stowed, packaged or bulk cargo can be disposed in the readily accessible central space without difficulty or hazard.

The cargo 27 is discharged by the reverse procedure and it will be noted that the difficulties normally associated with cargo stowage and discharge are substantially removed.

Specific mention has not been made of subsidiary equipment such as flexible couplings, anti-friction bearings, lubrication means, electrical circuits, limit switches, actuating control means and the like, because such items follow standard engineering practice, but are, nevertheless, within the scope of the invention when in combination with the essential elements hereinbefore described.

What I claim is:

1. Equipment for handling ship's cargo in association with a ship's floor having two transversely spaced sets of tracks on the floor, each set comprising a plurality of longitudinally spaced approximately parallel tracks, the said equipment comprising longitudinally extending pallets displaceably supported respectively on the sets of tracks, each pallet comprising a mobile framework incorporating two or more longitudinally spaced housings, each housing having a link pivotally connected at its outer end thereto, and having at its inner end a trunnion-mounted internally screw-threaded sleeve, and power operated means for transversely displacing the pallets towards or away from each other simultaneously, said displacing means comprising approximately central main longitudinal shafting, means for rotating the main shafting, spaced transverse screw-threaded rotatable shafts each threadably engaged at its outer end in the screwthreaded sleeve on a pallet, and means rotatably coupling each transverse shaft at its inner end to the main shafting.

2. Equipment as in claim 1 including a bogie pivotally mounted between its ends on each end of each pallet, and a bearing roller on each end of each bogie adapted to engage abutments on the ship's structure to limit longitudinal movement of the pallet.

References Cited in the file of this patent

UNITED STATES PATENTS

| | | |
|---|---|---|
| 1,756,518 | McMillan | Apr. 29, 1930 |
| 2,122,992 | Pride | July 5, 1938 |
| 2,379,231 | Harrison | June 26, 1945 |
| 2,564,966 | Farrell | Aug. 21, 1951 |
| 2,594,207 | Pierce | Apr. 22, 1952 |

FOREIGN PATENTS

| | | |
|---|---|---|
| 327,244 | Great Britain | Apr. 3, 1930 |